United States Patent [19]

Harris et al.

[11] 4,175,063

[45] Nov. 20, 1979

[54] RESINOUS PRODUCT

[75] Inventors: Robert R. Harris, Burnham; Warren J. Pollack, Carpentersville, both of Ill.

[73] Assignee: International Minerals & Chemical Corporation, Terre Haute, Ind.

[21] Appl. No.: 911,654

[22] Filed: Jun. 1, 1978

[51] Int. Cl.$^2$ .................. C09D 3/52; C09D 3/64; C09D 3/66
[52] U.S. Cl. .................. 260/22 R; 260/21; 260/22 M; 260/22 CA; 260/22 CQ
[58] Field of Search ............ 260/22 M, 22 R, 22 CA, 260/21, 22 CQ

[56] References Cited

U.S. PATENT DOCUMENTS

| 2,715,111 | 8/1955 | Weinberg | 260/22 CA |
| 3,097,245 | 7/1963 | Russell et al. | 260/22 R |
| 3,157,618 | 11/1964 | Le Bras et al. | 260/22 M |
| 3,666,698 | 5/1972 | Harris et al. | 260/29.2 E |
| 3,714,090 | 1/1973 | Lasher | 260/22 M |
| 3,928,265 | 12/1975 | Dhein et al. | 260/22 R |
| 4,040,995 | 8/1977 | Sekmakas et al. | 260/22 R |
| 4,045,391 | 8/1977 | Buschfeld | 260/22 M |
| 4,049,599 | 9/1977 | Lott | 260/22 R |

*Primary Examiner*—Ronald W. Griffin
*Attorney, Agent, or Firm*—Robert H. Dewey; Howard E. Post

[57] ABSTRACT

A high solids resinous product obtained by the process comprising reacting an unsaturated aliphatic monocarboxylic acid, one or more aromatic dicarboxylic acids or anhydride thereof, a mixture of bis- and tris(hydroxy)-alkanes and a monohydric alcohol, in the presence of catalytic amounts of dibutyl tin oxide and a solvent at a temperature of up to 430° F. until the acid value is less than about 3.0, said resinous product having a nonvolatile content of about 90% and a Gardner viscosity about $Z_1$.

2 Claims, No Drawings

RESINOUS PRODUCT

BACKGROUND OF THE INVENTION

This invention relates to a resinous product. In a particular aspect, this invention relates to a resinous product adapted to the preparation of high-solids protective coatings.

Solvent-based coatings systems are disadvantageous because evaporation of the solvent pollutes the environment. Also, the cost of the solvent represents a considerable proportion of the total cost of the system, so loss of the solvent is economically wasteful. In large installations, solvent recovery is feasible and often practiced, but large amounts of coatings are used in smaller installations where recovery is not practiced resulting in loss of the solvent and pollution of the environment.

Many schemes have been suggested to avoid the use of solvents. However, for one reason or another, they have not eliminated the need of a solvent-based system. Accordingly, there is a need for a coatings system high in solids content to minimize the volume of solvents used. However, high solids systems often are high in viscosity so that the liquid coating does not flow out on the article being coated, thus giving an unattractive finish. For example, conventional short oil alkyds are high in viscosity even when diluted to 50% with an aromatic solvent.

Accordingly, there is a need for a resinous product which can be applied with a minimum of solvent.

SUMMARY OF THE INVENTION

It is an object of this invention to provide a resinous product.

It is another object of this invention to provide a resinous product adapted to the preparation of high-solids protective coatings.

Other objects of this invention will be apparent to those skilled in the art.

It is the discovery of this invention to provide a high solids resinous product obtained by the process of reacting an unsaturated aliphatic monocarboxylic acid; one or more aromatic dicarboxylic acids or anhydrides thereof; a polyol or mixture thereof; and a monohydric alcohol in the presence of catalytic amounts of dibutyl tin oxide at a temperature of up to 430° F. until the acid value is less than about 3.0, said resinous product having a non-volatile content of about 96%, a Gardner viscosity about $Z_1+$ and a viscosity at 125° C. of about 0.4 poise. Sufficient solvent is then added to reduce the solids content to any desired figure, usually about 90% wt.

DETAILED DISCUSSION

The resinous product of the present invention is prepared by a one-step process wherein the components are charged to a reaction vessel and heated to 430° F. while removing water of reaction until the acid value is below about 3. The product thereby obtained is sufficiently fluid that it can be employed as a protective coating at 20% solvents or less, e.g. 90% solids.

The components of the resinous product of this invention, a high-solids, short-oil alkyd, include from about 32-34% by weight of an aliphatic unsaturated acid of 12-20 carbon atoms, or mixture thereof; from about 36-38% by weight of one or more aromatic dicarboxylic acids; from 28-30% of a polyol or mixture thereof; from 1.2 to 1.4% of a monohydric alkanol, and a condensation catalyst.

The aliphatic unsaturated acids of the present invention include those of 12-20 carbon atoms, but those of 18 carbon atoms are preferred. If desired, relatively pure linoleic or linolenic acids can be used, but preferably a mixture of acids such as soybean fatty acids, tung oil acids, or, preferably, low-rosin tall oil fatty acids are selected. Tall oil fatty acids are a by-product of the paper industry. A preferred grade is that marketed as Actinol by Arizona Chemical Company.

The aromatic dicarboxylic acids of the present invention include isophthalic and o-phthalic acids, or phthalic anhydride. Either acid can be used alone, but preferably a mixture of isophthalic acid and phthalic anhydride in a ratio of about 1.5:1 by weight is used.

The polyols used in preparing the product of the present invention include glycols and triols, such as ethylene and propylene glycols and trimethylolethane and trimethylolpropane. The preferred polyols are trimethylolpropane and ethylene glycol in a weight ratio of about 2.6:1 respectively.

The monohydric alcohols useful in the practice of this invention are those of $C_4$, such as isobutyl or sec.-butyl alcohol, preferably n-butyl alcohol. The monohydric alcohol acts as a solvent during the early part of the reaction before it is consumed thereby.

Any condensation catalyst known to those skilled in the art can be employed to effect the condensation of the resinous product. Dibutyl tin oxide is a preferred catalyst. It is generally, but not necessarily, used in an amount of about 0.001 to 0.002%.

From the foregoing, it is apparent that this invention provides a high-solids resinous product obtained by the process comprising, in the preferred embodiment, the step of reacting an unsaturated fatty acid of 18 carbon atoms or mixture thereof, about 32–34%, isophthalic acid, about 21–23%, and phthalic anhydride, about 14–16%, with trimethylolpropane, about 20–22%, ethylene glycol, about 8.0–8.4%, and n-butanol, about 1.1–1.5%, in the presence of catalytic amounts of dibutyl tin oxide and a solvent at a temperature of up to 430° F. until the acid value is less than about 3.0. The resinous product has a non-volatile content of about 96%, a Gardner viscosity about $Z_1$ and the viscosity at 125° C. is about 0.4 poise. It is diluted to 90% solids with a suitable solvent of which there are many. Ethoxyethyl acetate is a preferred solvent.

The invention will be better understood with reference to the following example. It is understood that the example is intended only for illustration and it is not intended that the invention be limited thereby.

EXAMPLE 1

To a reaction vessel there was delivered the following ingredients:

| | | |
|---|---|---|
| Fatty acid* | 1228 lb | 32.37% |
| Isophthalic acid | 839 lb | 22.20% |
| Phthalic anhydride | 556 lb | 14.66% |
| Trimethylolpropane | 810 lb | 21.35% |
| Ethylene glycol | 311 lb | 8.20% |
| n-Butanol | 49 lb | 1.29% |
| Dibutyl tin oxide | 5.8 lb | |

*Actinol low-rosin tall oil fatty acids.

The mixture was heated to 430° F. until the acid value was less than 3.0. At the end of the reaction, the nonvolatile matter was 96%, the Gardner viscosity was $Z_{1+}$ and the viscosity at 125° C. was 0.4 poise. Sufficient ethoxyethyl acetate was added to reduce the solids content to 90% wt.

The foregoing resin, designated Chemacoil 900, was formulated into a high solids paint by mixing with the following ingredients:

| | |
|---|---:|
| Chemacoil 900 | 350.0 g |
| Flow control agent** | 1.5 g |
| Titanium dioxide | 546.6 g |

**FC-430, a fluorocarbon marked by 3M Company was used.

This mixture was ground in a mill and then the following was added and thoroughly mixed:

| | |
|---|---:|
| Chemacoil 900 | 148.7 g |
| Melamine resin | 149.6 g |
| Ethoxyethyl acetate | 40.5 g |
| Methylethyl ketone | 33.5 g |
| Butoxyethyl acetate | 18.0 g |
| Catalyst* | 10.0 g |

*A 30% solution of p-toluenesulfonic acid in isopropyl alcohol.

A sample of the above was drawn down on a steel panel and baked 15 minutes at 350° F. It yielded a film thickness of 1.8 mils. It had a gloss of 89, a pencil hardness of F and passed 100 methylethyl ketone rubs.

We claim:

1. A high-solids resinous product obtained by the process comprising reacting an unsaturated aliphatic monocarboxylic acid 32–34%, one or more aromatic dicarboxylic acids or anhydrides thereof 36–38%, a mixture of bis- and tris(hydroxy)alkanes 28–30% and a monohydric alcohol 1.2–1.4%, in the presence of catalytic amounts of dibutyl tin oxide and a solvent at a temperature of up to 430° F. until the acid value is less than about 3.0, said resinous product having a non-volatile content of about 96%, a Gardner viscosity about $Z_1$ and a viscosity at 125° C. of about 0.4 poise.

2. A high-solids resinous product obtained by the process comprising reacting an unsaturated fatty acid of 18 carbon atoms or mixture thereof 32–34%, isophthalic acid 21–23%, and phthalic anhydride 14–16%, with trimethylolpropane 20–22%, ethylene glycol 8.2% and n-butanol 1.3% in the presence of catalytic amounts of dibutyl tin oxide and a solvent at a temperature of up to 430° F. until the acid value is less than about 3.0, said resinous product having a non-volatile content of about 96%, a Gardner viscosity about $Z_1$ and a viscosity at 125° C. of about 0.4 poise.

* * * * *